Nov. 24, 1942.    R. G. LE TOURNEAU    2,302,964
EARTH ROLLER
Filed Sept. 15, 1941    3 Sheets-Sheet 3
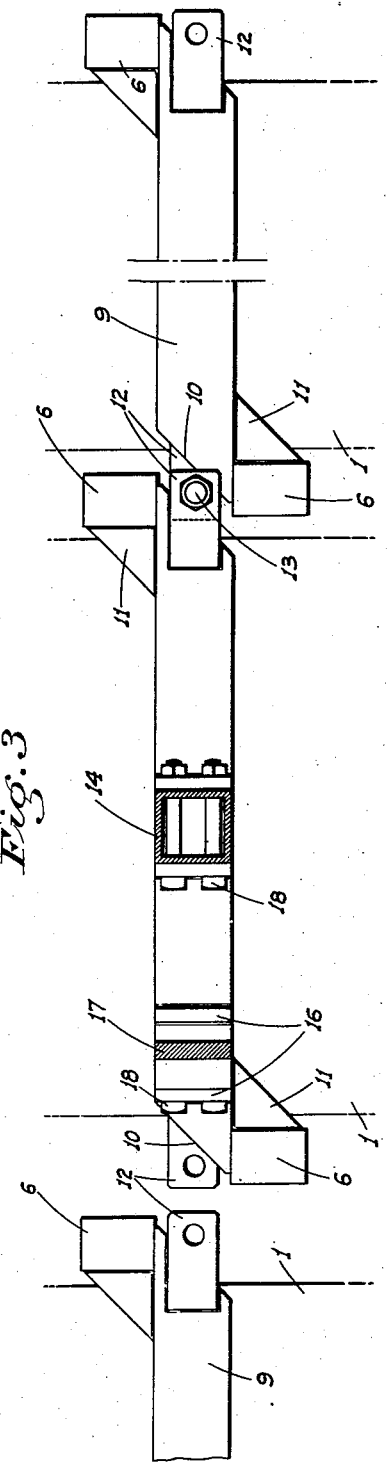
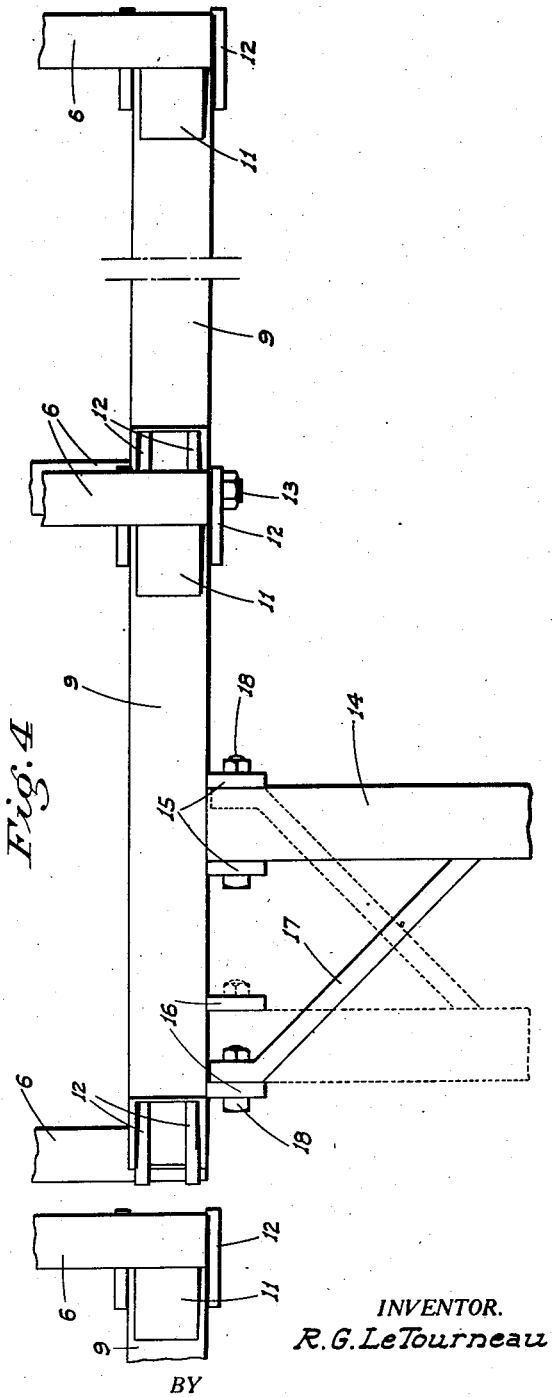
INVENTOR.
R. G. LeTourneau
BY
ATTORNEYS Patented Nov. 24, 1942

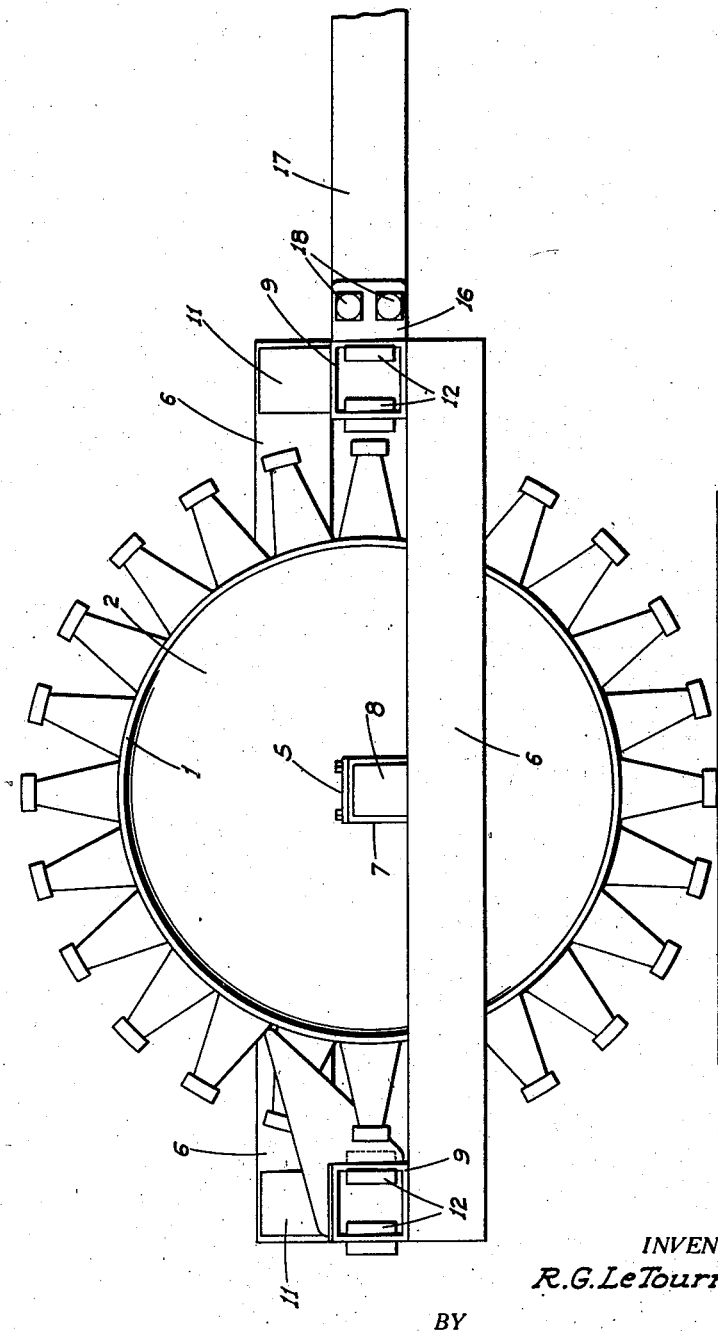

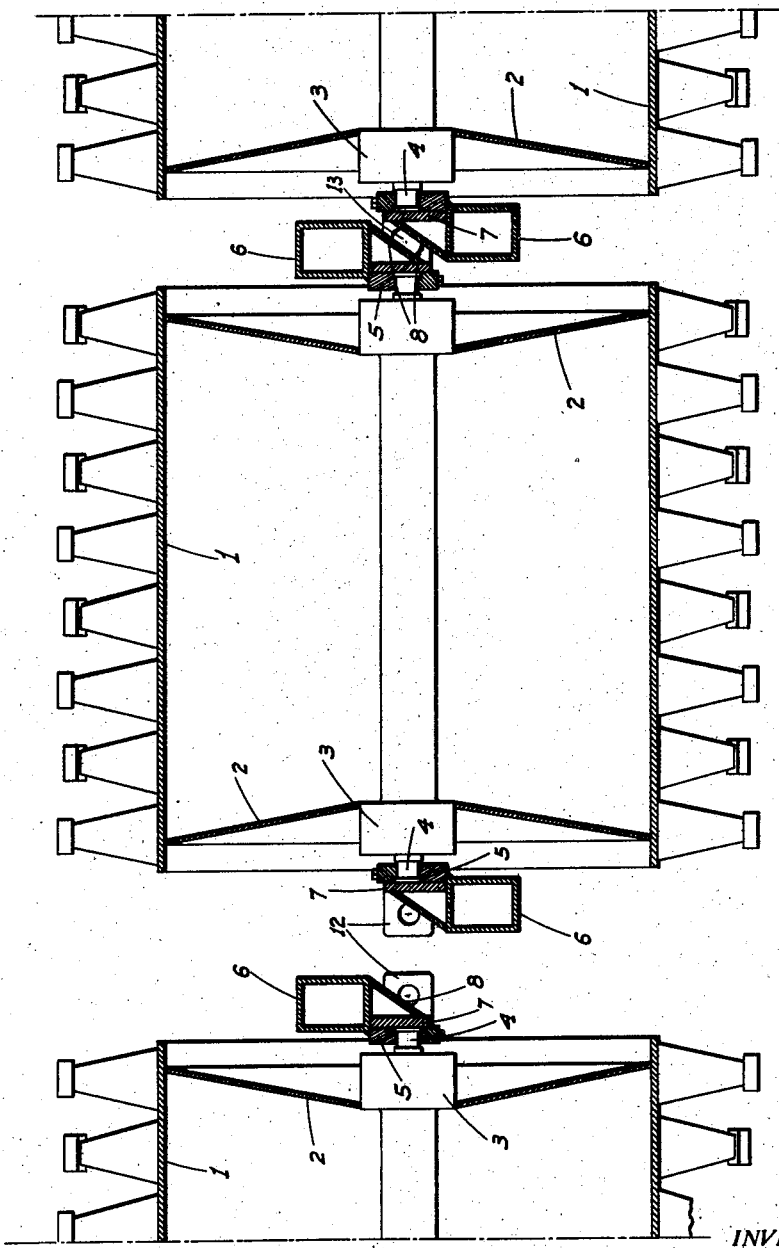

2,302,964

UNITED STATES PATENT OFFICE 2,302,964

EARTH ROLLER

Robert G. Le Tourneau, Peoria, Ill., assignor to R. G. Le Tourneau, Inc., a corporation Application September 15, 1941, Serial No. 410,834

4 Claims. (Cl. 55—47)

This invention is directed in general to an earth rolling and packing implement, and in particular the invention is directed to improvements over a roller implement as shown in my United States Patent No. 2,245,865, dated June 17, 1941, and wherein the implement includes a plurality of independent roller units connected in end to end and articulated relation transversely of the line of draft; the type of implement being self-adjusting to grounded contours and thus very effective in use.

One of the objects of the present invention is to produce a multiple roller unit implement which is constructed so that the separate roller units, which are detachable one from another, can be connected into the assembly in any desired number, and in any position relative to the central or draft unit to which the draft tongue is applied; this being a distinct advantage over the prior implement in which the separate roller units could occupy only one certain position. With the present arrangement, detached units of the implement can be connected in operative assembly, with the expenditure of much less effort and time than previously required, for the reason that the separate roller units are alike in construction, are readily coupled, and have frames which are invertible to position adjacent end beams in the desired overhanging relation.

A further object of the invention is to provide roller unit frames which, when coupled end to end, position the rollers in relatively close relation, leaving only a narrow gap therebetween and as is necessary to permit free articulation of the implement units.

Another object of the invention is to provide means whereby the draft tongue can be connected to the implement substantially centrally of its ends regardless of whether the number of connected roller units is an odd or even number.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is an end view of the implement.

Figure 2 is a longitudinal sectional elevation showing a roller unit coupled at one end to the adjacent unit, and uncoupled at the other end from an adjacent unit.

Figure 3 is a front elevation of the frames of the roller units shown in Fig. 2.

Figure 4 is a fragmentary plan view of said frames, and including the draft tongue and connecting means therefor.

Referring now more particularly to the characters of reference on the drawings, each of the roller units comprises a roller or drum 1 of suitable construction and including heads 2 on which are mounted anti-friction bearings 3; a shaft 4 extending through the roller and terminating at its ends only slightly beyond the ends of said roller. At each end the shaft is fitted with attachment blocks 5. The rollers here shown are of the "sheep's foot" type but this forms no part of the present invention.

Each roller is surrounded by a rectangular frame which embodies parallel end beams 6 disposed substantially horizontally beyond but relatively close to the ends of the roller, one such end beam being above the axis of the roller, and the other or opposite end beam below said axis; both said end beams being equidistant from the axis. Bracket plates 7 are fixed on end beams 6 centrally of their ends and project from the inner edge of the adjacent side of said beams across the ends of the axle 4; attachment blocks 5 and plates 7 being secured together in face to face relation as by welding. Diagonal bracing 8 connects between the outer edge of said adjacent side of beams 6 and the free end of bracket plates 7; the diagonal position of these braces permitting end beams 6 of adjacent roller units to overhang each other to a substantial extent (see Fig. 2).

Front and back beams 9, disposed parallel to and radially of the roller axis, extend the full length of each roller, and at their ends lap and are fixed on the ends of end beams 6; said beams 9 underlapping one end beam and overlapping the opposite end beam. Ends of beams 9 are beveled as at 10 parallel to and in alinement with the braces 8; this being to permit the end beams to overhang each other without the beams 9 of adjacent roller units abutting each other.

Beams 6 and 9 are suitably reinforced at the point of connection as by members 11.

Roller units disposed in end to end relation are coupled together, with the end beams overhanging, by means of cooperating pairs of ears 12 alined with the roller axis and which project lengthwise from the beveled ends of beams 9. These pairs of ears are spaced so that when the adjacent end beams of adjacent roller units overhang, the pairs on one unit project in snug engagement between the ears of the corresponding pairs on the other unit. The cooperating pairs of ears are detachably secured together in hinged or articulated relation by hinge bolts 13.

The draft tongue 14 projects forwardly from the front beam 9 of one of the roller units, and at the rear end is secured to said beam either centrally of the ends of the latter between a pair of spaced ears 15, or is secured to said beam adjacent one of its ends between a pair of spaced ears 16, as shown in Fig. 4. When the implement includes an odd number of roller units the tongue connects with ears 15, and when there are an even number of units, the tongue connects with ears 16. In this manner the point of draft can be maintained substantially centrally of the ends of the implement. A diagonal brace 17 extends rearwardly from the tongue ahead of its rear end and is formed to engage and be secured to one of the ears of the pair not connected with the tongue; the tongue when changed from one position to the other merely being inverted to properly position the brace. Alined tie bolts 18 connect the tongue and brace to the ears, so that the tongue is rigid with the frame.

It will be seen that the above described implement may be transported to a job with the roller units detached from each other and the tongue removed. At the point of use the roller units, in the desired number, are connected together, and which can be accomplished readily, quickly and without regard to positions relative to the unit to which the tongue attaches. Thereafter the tongue is attached beween pairs of ears 15 or 16 depending on whether the number of units in the implement is odd or even.

From the foregoing description it will be readily seen that I have produced such a device as substantially fulfills the objects of the invention as set forth herein.

While the specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. In an implement having a plurality of spaced rollers disposed in end to end relation, a substantially horizontal frame surrounding each roller, and means connecting said frames in vertically articulated relation; said frames being alike and including parallel end beams adjacent the ends of the rollers, the opposite end beams of each frame being, respectively, above and below the axis of the corresponding roller, adjacent end beams of adjacent frames being disposed in substantial overhanging relation, front and back beams connecting the end beams of each frame, said front and back beams being parallel to and radially alined with the axis of the corresponding roller, said front and back beams overlapping one end beam and underlapping the other end beam, and means hinging said frames together at adjacent ends for relative vertical swinging movements.

2. In an implement having a plurality of spaced rollers disposed in end to end relation, a substantially horizontal frame surrounding each roller, and means connecting said frames in vertically articulated relation; said frames being alike and including parallel end beams adjacent the ends of the rollers, the opposite end beams of each frame being, respectively, above and below the axis of the corresponding roller, adjacent end beams of adjacent frames being disposed in substantial overhanging relation, front and back beams connecting the end beams of said frame, said front and back beams being parallel to and radially alined with the axis of the corresponding roller, said front and back beams overlapping one end beam and underlapping the other end beam, cooperating ears secured on and projecting from adjacent ends of the front and back beams of adjacent frames, and means pivoting said ears together for relative vertical swinging movement of said frames.

3. In an implement having a plurality of spaced rollers disposed in end to end relation, a substantially horizontal frame surrounding each roller, and means connecting said frames in vertically articulated relation; said frames being alike and including parallel end beams adjacent the ends of the rollers, the opposite end beams of each frame being, respectively, above and below the axis of the corresponding roller, adjacent end beams of adjacent frames being disposed in substantial overhanging relation, front and back beams connecting the end beams of said frame, said front and back beams being parallel to and radially alined with the axis of the corresponding roller, said front and back beams overlapping one end beam and underlapping the other end beam, cooperating ears secured on and projecting from adjacent ends of the front and back beams of adjacent frames, and means pivoting said ears together for relative vertical swinging movement of said frames; said adjacent ends of the front and back beams of adjacent frames being oppositely beveled lengthwise of said beams to provide clearance between said adjacent ends.

4. In an implement having a plurality of spaced rollers disposed in end to end relation, a substantially horizontal frame surrounding each roller, and means connecting said frames in vertically articulated relation; said frames being alike and including parallel end beams adjacent the ends of the rollers, the opposite end beams of each frame being, respectively, above and below the axis of the corresponding roller, and spaced equidistant from said axis, an axle projecting from the ends of each roller, attachment blocks on said ends of the axle, a bracket rigidly connecting each block with the corresponding end beam, and means hinging adjacent frames together for relative vertical swinging movement and with adjacent end beams of adjacent frames in overhanging relation; said brackets being arranged so that adjacent ones thereof are in clearance relation to each other.

ROBERT G. LE TOURNEAU.